United States Patent
Duan (10) Patent No.: US 7,388,358 B2
(45) Date of Patent: Jun. 17, 2008

(54) METHOD AND APPARATUS FOR A PULSE WIDTH MODULATED DC-DC CONVERTER

(75) Inventor: Zhan Duan, San Jose, CA (US)

(73) Assignee: Winbond Electronics Corporation, Hsinchu (TW)

( * ) Notice: Subject to any disclaimer, the term of this patent is extended or adjusted under 35 U.S.C. 154(b) by 218 days.

(21) Appl. No.: 11/436,508

(22) Filed: May 17, 2006

(65) Prior Publication Data

US 2007/0268009 A1 Nov. 22, 2007

(51) Int. Cl.
*H02M 1/08* (2006.01)
(52) U.S. Cl. .................... 323/282; 323/283; 363/97
(58) Field of Classification Search ............... 323/282, 323/283; 363/21.05, 21.13, 95, 97
See application file for complete search history.

(56) References Cited

U.S. PATENT DOCUMENTS

| | | | |
|---|---|---|---|
| 5,272,614 A * | 12/1993 | Brunk et al. ............ | 363/21.05 |
| 5,506,484 A | 4/1996 | Munro et al. | |
| 6,025,706 A | 2/2000 | Takimoto et al. | |
| 7,239,116 B2 * | 7/2007 | Tang .......................... | 323/282 |
| 2006/0022656 A1 * | 2/2006 | Leung et al. ............... | 323/283 |
| 2006/0132110 A1 * | 6/2006 | Tang .......................... | 323/282 |
| 2007/0018627 A1 * | 1/2007 | Chen ........................ | 323/283 |

* cited by examiner

*Primary Examiner*—Jeffrey L Sterrett
(74) *Attorney, Agent, or Firm*—Townsend and Townsend and Crew LLP (57) ABSTRACT

A pulse width modulated pulse signal is generated and its duty cycle adjusted according to at least two different schedules, for example, a coarse tuning cycle and a fine tuning cycle. The target duty cycle is derived according to an offset between output voltage and target voltage, as well as the rate of changes in the offset. In the coarse tuning cycle, large changes in the control signal pulse width is used to drive output voltage to target at a fast pace. As output voltage approaches target voltage, smaller adjustment are made to the duty cycle of the control pulse width in the fine tuning cycle. The rate of pulse width change is also taken into consideration, to further improve operation of the DC-DC converter.

20 Claims, 3 Drawing Sheets

METHOD AND APPARATUS FOR A PULSE WIDTH MODULATED DC-DC CONVERTER

BACKGROUND OF THE INVENTION

The present invention is directed to integrated circuits. More particularly, the invention provides a method and apparatus for controlling a DC-DC converter used to supply power to various electronics and telephony devices. Merely by way of example, the invention provides techniques for generating a pulse width modulation (PWM) signal in a DC-DC converter and adjusting its duty cycle using multiple thresholds according to at least two separate schedules, namely a coarse tuning cycle and a fine tuning cycle. But it would be recognized that the invention has a much broader range of applicability. For example, the invention can be used to improve convergence efficiency of PWM signals in other applications.

DC to DC converters are often found in electronic devices. These devices include cellular phones and laptop computers which may require certain voltage levels different than supplied by the power source, or even negative voltages. In telephony applications, a subscriber line interface circuit (SLIC) often needs a high voltage to drive a POTS (plain old telephone service) phone.

DC to DC converters can be used to convert a DC voltage level to another. These circuits generally perform the conversion by first applying a DC voltage across an inductor or transformer for a period of time, which causes current to flow through it and store energy magnetically. During the time the DC voltage is switched off, the stored energy is transferred to an output terminal in a controlled manner. By adjusting the ratio of on/off time, also known as duty cycle, of the control pulse, the output voltage can be regulated even as the current demand changes. In addition, DC-DC converters can convert a DC input power to a DC output power while maintaining isolation between input and output, generally allowing differences in the input-output ground potentials. Further details of conventional DC-DC converters are provided throughout the present specification and more particularly below.

Figure 1:
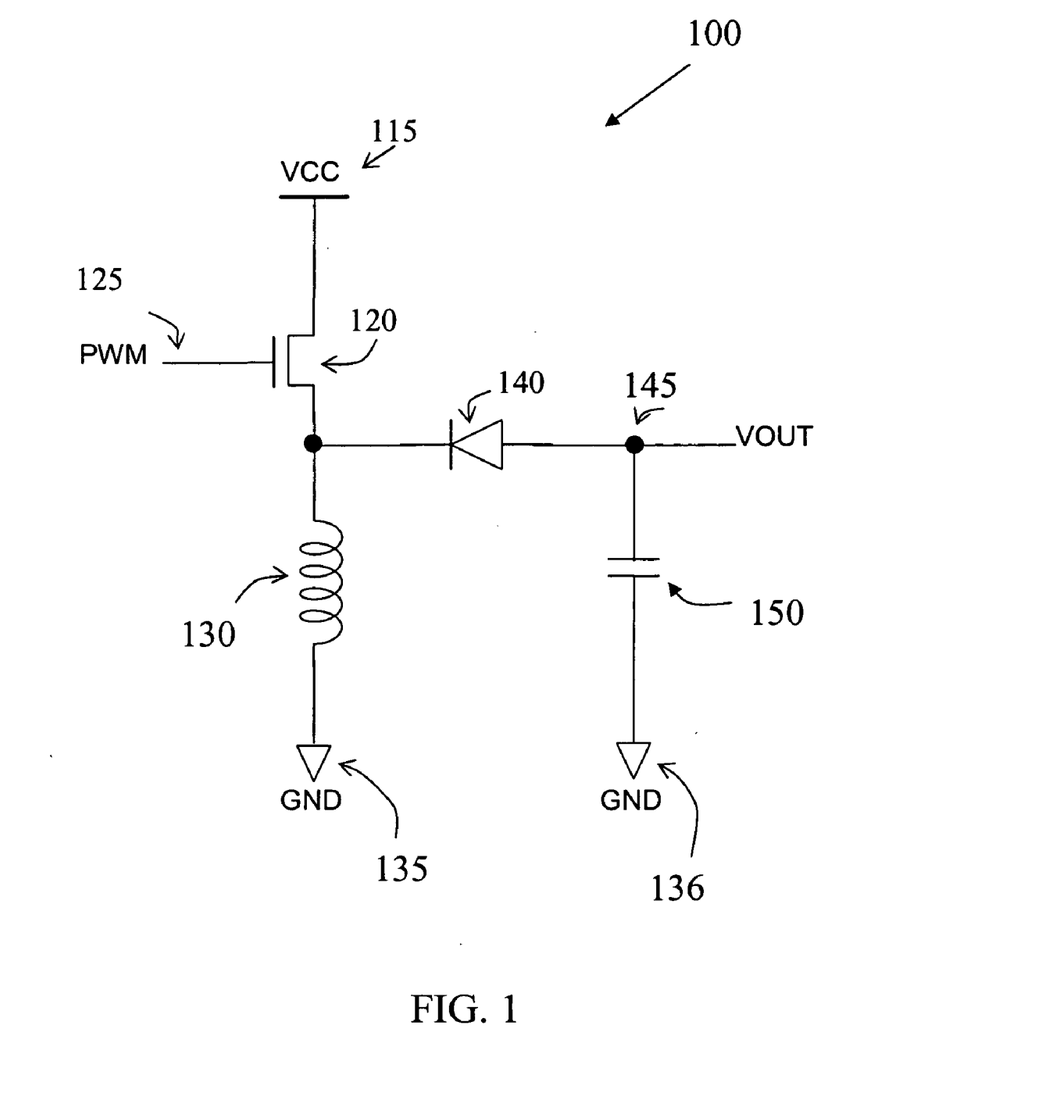
FIG. 1 shows a schematic diagram illustrating a conventional DC-DC converter.

As an example, FIG. 1 shows a simplified schematic for a conventional DC-DC converter 100 capable of generating an output voltage either greater than or less than the input voltage. This DC converter is often useful in electronic or telephony applications The output voltage is adjustable based on the duty cycle of a switching transistor 120. A simplified explanation of a general operation of the converter is described below. While transistor 120 is in the ON state, input voltage source Vcc 115 is directly connected to inductor 130, accumulating energy in inductor 130. In this stage, capacitor 150 supplies energy to an output load connected to Vout 145. When transistor 120 is in the OFF state, inductor 130 is connected to capacitor 150 and an output terminal, so energy is transferred from inductor 130 to capacitor 150 and output terminal 145. The magnitude of output voltage is determined by the ratio of on/off times, or the duty cycle, of the pulse width modulated control signal 125.

In applications related to DC-DC converters, a feedback control loop can be included such that converter output tracks a predetermined reference voltage. In such an application, an error signal is first generated representing the offset between output voltage and target voltage. Then the error signal is compared with a triangular or saw tooth wave signal to generate a pulse-width modulated control signal, which can be used to control a switching device, such as transistor 120 in FIG. 1. Transistor 120 responds to the PWM signal to regulate output voltage to a predetermined voltage level.

Conventional pulse width modulators generally fall into one of two classes, analog PWM and digital PWM. In an analog PWM, control pulses are generated in analog circuits such as operational amplifiers and comparators, whereas in a digital PWM, control pulses are generated by digital logic circuits designed to implement a certain control algorithm. Analog PWMs generally provide more accurate pulse width control and faster response time. Unfortunately, conventional analog PWM controlled DC-DC converters suffer from certain limitations. For instance, conventional analog PWM controlled DC-DC converters can be susceptible to temperature and process variation and often consume more power and larger silicon area. There may also be other limitations with these conventional analog PWM controlled DC-DC converter.

To overcome certain limitations of the analog PWM converter, a digital PWM has been introduced. The Digital PWM can be used to avoid the complexity and high power consumption of its analog counterpart. In a digital PWM, a control signal is generated with a duty ratio in accordance with a difference between an output voltage and a target input voltage. A digital waveform generator is then used to produce a PWM signal having a duty cycle determined by the control signal. Alternatively, a digitized triangular waveform can be compared with a digitized output voltage to generate a digital PWM signal. Although successful, conventional digital PWM converters suffer from certain drawbacks. Conventional DC-DC converters utilizing digital PWMs tend to suffer from limited accuracy, because adjustment time step is limited by clock rate and incremental voltage change is dictated by digitization limitations. Further, conventional digital PWM converters tend to have relatively long response time, causing noise and output voltage overshoot or undershoot. These and other limitations of these conventional converters may be further explained throughout the present specification.

From the above, it is seen that an improved technique for controlling a DC-DC converter is desired.

BRIEF SUMMARY OF THE INVENTION

According to the present invention, techniques directed to integrated circuits are provides. More particularly, the invention provides a method and apparatus for controlling a DC-DC converter used to supply power to various electronics and telephony devices. Merely by way of example, the invention provides techniques for generating a pulse width modulation (PWM) signal in a DC-DC converter and adjusting its duty cycle using multiple thresholds according to at least two separate schedules, namely a coarse tuning cycle and a fine tuning cycle. But it would be recognized that the invention has a much broader range of applicability. For example, the invention can be used to improve convergence efficiency of PWM signals in other applications.

In a specific embodiment of the present invention, a method for generating a PWM pulse signal for controlling a DC-DC converter includes providing at least two clock pulses having at least two different frequencies, a first clock pulse signal characterized by a first frequency and a second clock pulse signal characterized by a second frequency, the second frequency of the second clock pulse signal being higher than the first frequency of the first clock pulse signal. The method also includes providing a pulse width control signal characterized by a predetermined initial value, deriving a feedback measurement from the DC-DC converter, the feedback measurement being associated with a difference between an output voltage of the DC-DC converter and a target voltage, and then making adjustments to the pulse width control signal according to at least two schedules. In an embodiment, the method provides making a coarse adjustment to the pulse width control signal in every cycle of the first clock pulse signal, the coarse adjustment being associated with the feedback measurement and making a fine adjustment in every cycle of the second clock pulse signal, the fine adjustment being associated with the feedback measurement. The method also includes generating a pulse-width modulated (PWM) pulse signal characterized by a PWM clock frequency, the duty cycle of the PWM pulse signal being characterized by the pulse width control signal determined above.

In a specific embodiment of the invention, deriving the feedback measurement includes deriving an offset signal associated with a difference between an output voltage of the converter and a target voltage and deriving a rate signal associated with a difference between two offset signals from two consecutive clock cycles of the second clock pulse signal. An embodiment of the invention also includes generating a pulse-width modulated (PWM) pulse signal by providing a PWM clock pulse signal, the clock pulse being characterized by a PWM clock frequency and adjusting the pulse width of the pulse-width modulated (PWM) pulse signal, the pulse width of the PWM pulse signal being characterized by the pulse width control signal. In an embodiment, the first frequency can be about 800 Hz. In a specific embodiment, the second frequency can be about 64 kHz. In an embodiment, the predetermined initial value for the pulse width control signal can be zero or a predetermined maximum signal. Further, the PWM pulse signal can be characterized by the second frequency of the second clock pulse signal.

In an alternative specific embodiment, the invention provides for a method for controlling a DC-DC converter that includes providing a first clock pulse signal characterized by a first frequency, providing a second clock pulse signal characterized by a second frequency, the second frequency of the second clock pulse signal being higher than the first frequency of the first clock pulse, deriving a feedback measurement from the DC-DC converter, the feedback measurement being associated with a difference between an output voltage of the DC-DC converter and a target voltage, processing the feedback measurement using the first clock pulse to generate a pulse width control signal, processing the feedback measurement using the second clock pulse to adjust the pulse width control signal, and generating a pulse-width modulated (PWM) pulse signal, the pulse width of the PWM pulse being characterized by the pulse width control signal, applying the PWM pulse signal to an output transistor of the DC-DC converter; and, generating the output voltage by causing an output transistor of the DC-DC converter to turn on or off in response to the PWM pulse signal.

In a specific embodiment of the invention, an apparatus for controlling the output voltage of a DC-DC converter includes a first clock generator configured to generate, a first clock pulse signal characterized by a first frequency, a second clock generator configured to generate a second clock pulse signal characterized by a second frequency, the second frequency of the second clock pulse signal being higher than the first frequency of the first clock pulse, and a target signal line. The apparatus also includes an analog-to-digital converter coupled to an output of the DC-DC converter, an first comparator circuit coupled to an output of the DC-DC converter and the target signal line, the first comparator being configured to determine whether the output signal of the DC-DC converter has crossed over the target signal, a second comparator circuit coupled to an output of the analog-to-digital converter and the target signal line, the second comparator circuit being configured to derive an offset signal and an offset rate signal associated with a difference between an output signal of the analog-to-digital converter and the target signal, a third comparator circuit coupled to an output of the first comparator and an output of the second comparator, the third comparator circuit being configured to derive a pulse-width control signal in every clock cycle of the first clock pulse signal and in every clock cycle of the second clock pulse signal, the pulse-width control signal being associated with the offset signal and the offset rate signal and a PWM pulse generator configured to generate a pulse-width modulated (PWM) pulse signal, the pulse width of the PWM pulse signal being characterized by the pulse-width control signal.

In yet another specific embodiment of the invention, a DC-DC converter includes a DC-DC converter, a first clock generator configured to generate a first clock pulse signal characterized by a first frequency, a second clock generator configured to generate a second clock pulse signal characterized by a second frequency, the second frequency of the second clock pulse signal being higher than the first frequency of the first clock pulse, a feedback control circuit configured to derive a feedback measurement from the DC-DC converter, the feedback measurement being associated with a difference between an output voltage of the DC-DC converter and a target voltage, a first signal generator configured to process the feedback measurement using the first clock pulse to generate a pulse width control signal, a second signal generator configured to process the feedback measurement using the second clock pulse to adjust the pulse width control signal, a PWM pulse generator configured to generate a pulse-width modulated (PWM) pulse signal, the pulse width of the PWM pulse signal being characterized by the pulse width control signal, and a coupling circuit configured to couple the PWM pulse signal to an output transistor of the DC-DC converter. In an embodiment, the feedback control circuit further includes a first feedback comparator circuit configured to derive an offset signal, the offset signal being associated with a difference between an output voltage of the DC-DC converter and a target voltage, and a second feedback comparator circuit configured to derive an offset rate signal, the offset rate signal being associated with the difference between two offset signals from two consecutive clock cycles of the second clock pulse signal. In an embodiment, the PWM pulse generator further includes a PWM clock pulse signal generator characterized by a PWM clock frequency and a pulse width adjusting circuit configured to adjust the pulse width of the PWM clock signal, the pulse width being associated with the pulse width control signal. In an embodiment, the first frequency can be about 800 Hz. In a specific embodiment, the second frequency can be about 64 kHz. In an embodiment, the predetermined initial value for the pulse width control signal can be zero or a predetermined maximum signal. Further, the PWM pulse signal can be characterized by the second frequency of the second clock pulse signal.

Many benefits are achieved by way of the present invention over conventional techniques. The invention provides a method and device for an DC-DC converter having smaller chip area, higher efficiency, higher accuracy, faster response time, and reduced overshoot or undershoot of the output signal. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques directed to integrated circuits are provides. More particularly, the invention provides a method and apparatus for controlling a DC-DC converter used to supply power to various electronics and telephony devices. Merely by way of example, the invention provides techniques for generating a pulse width modulation (PWM) signal in a DC-DC converter and adjusting its duty cycle using multiple thresholds according to at least two separate schedules, namely a coarse tuning cycle and a fine tuning cycle. But it would be recognized that the invention has a much broader range of applicability. For example, the invention can be applied to improve convergence efficiency of PWM signals in other applications.

A method according to an embodiment of this invention includes at least two major parts: for example, one for coarse tuning and one for fine tuning. In the coarse tuning process, DC-DC converter output voltage is periodically sampled and compared with a predetermined target voltage, and the difference, or offset, between these two voltages is calculated and used adjust pulse width of the PWM control signal. In an aspect of the invention, the offset voltage is first compared against a set of predetermined threshold voltages in order to determine a change in pulse width (step size) needed to drive the output voltage towards the target. In order to shorten adjustment time, bigger step sizes are used for larger offsets when output voltage is farther away from the target. When the offset becomes smaller, step size is reduced accordingly to minimize overshoot or undershoot. In the mean time, when overshoot or undershoot does occur, a fine tuning process is executed more frequently than the coarse tuning process. In the fine tuning process, target voltage and output voltage are compared to generate an Up/Down signal indicating a cross-over between output voltage and target voltage. The fine tuning process is triggered when a polarity change is detected on the Up/Down signal, then PWM control pulse width will be adjusted in small step sizes to control overshoot or undershoot. Once the offset is reduced to a predetermined low level and when the DC-DC output voltage is approaching the target voltage, step size will be reduced to zero. Then the PWM pulse width will remain constant. By using methods and apparatus in accordance to embodiments of this invention, efficient and accurate control of DC-DC output voltage can be achieved.

These and other benefits will be described in more details throughout the present specification and more particularly below.

Figure 2:
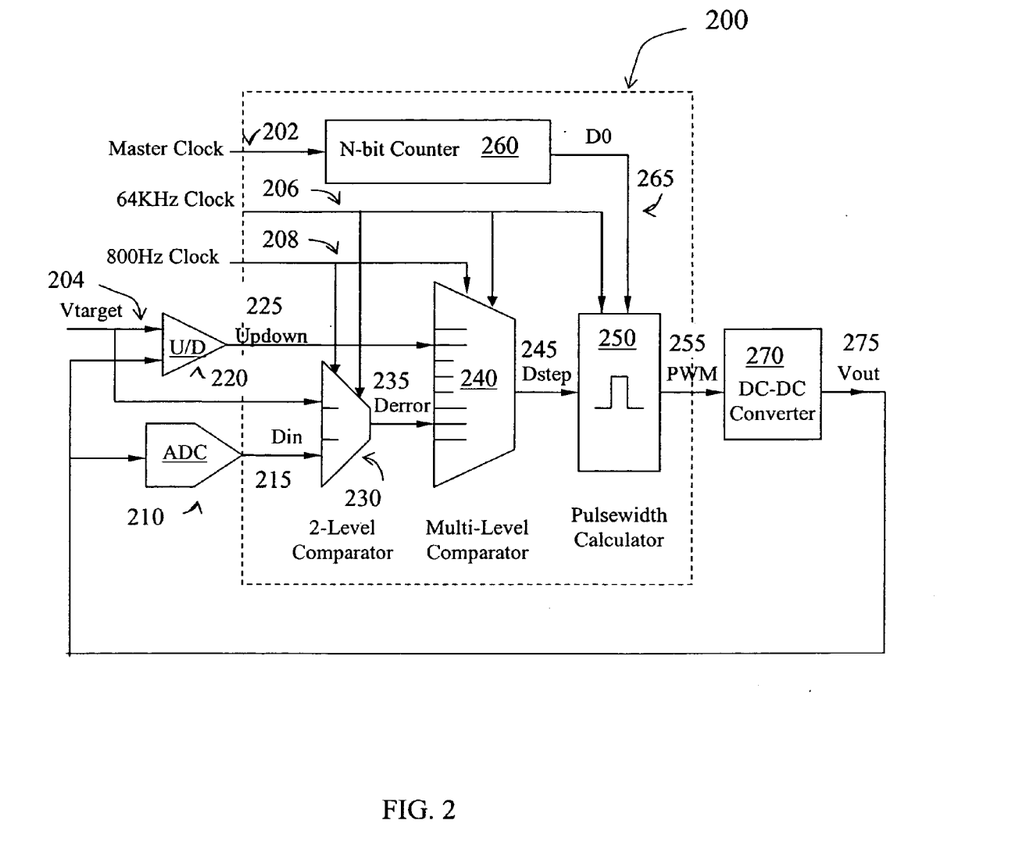
FIG. 2 shows a simplified schematic diagram illustrating functional blocks of a DC-DC converter according to an embodiment of the present invention.

As an example, FIG. 2 shows a simplified illustration of a block diagram of a DC-DC converter according to an embodiment of the present invention. FIG. 2 includes a digital PWM pulse generator 200, an analog-to-digital converter 210, an up-down comparator 220, and a DC-DC converter 270. Converter 270 can be a conventional DC-DC converter shown in FIG. 1 and discussed previously. PWM pulse generator 200 includes 2-level comparator 230, multi-level comparator 240, pulse width calculator 250, and N-bit counter 260. In a particular embodiment, 2-level comparator 230, multi-level comparator 240, and pulse-width calculator 250 are driven by a 64 KHz clock 206. The 2-level comparator 230 and multi-level comparator 240 also receive clock pulses from the 800 Hz clock 208. N-bit counter 260 is used to count the pulse number of Master clock 202 for the control of PWM pulse width. N-bit counter 260 also determines a minimum unit, dD, for a PWM pulse width. In addition, dD is also the smallest unit for Dstep 245, the PWM pulse control signal generated in multi-level comparator 240. A brief description of the general operation of the circuits in FIG. 2 is now given below.

In the feedback control loop illustrated in FIG. 2, analog output voltage Vout 275 of DC-DC converter 270 is converted to a digital signal Din 215 by analog-to-digital converter (ADC) 210. Din 215 and a predetermined target signal Vtarget 204 are coupled to 2-level comparator 230. For every clock cycle of the 64 KHz clock 206, a Derror signal 235 is generated. As will be discussed further below, Derror is determined from measurements of the offset between Vout 275 and Vtarget 204 as well as the rate of change of offsets between the present and previous clock cycles. The up-down comparator 220 receives Vout 275 and Vtarget 204 and generates an Updown signal 225, indicating whether Vout 275 has crossed over Vtarget 204 as Vout 275 is being adjusted by the PWM pulse. In other words, the Updown signal 225 indicates whether an overshoot or undershoot condition has taken place. The various signals are further processed to derive a PWM control pulse, as discussed further below.

In FIG. 2, multi-level comparator 240 generates a pulse width control signal Dstep 245 in response to the offset between Vout 275 and Vtarget 204, the rate of change in offset, and updown signal 225. Pulse width calculator 250 then uses Dstep 245 and output D0 265 from N-bit counter 260 to generate a PWM pulse signal 255. PWM pulse signal 255 is connected to DC-DC converter 270 to provide an output Vout 275. Various methods can be used to generate PWM pulse signal 255 in response to a PWM control pulse signal. A particular embodiment according to this invention will be discussed in a subsequent paragraph.

In a specific embodiment of the invention, PWM signal 255 has a frequency of 64 KHz, and the fine tuning adjustment cycle is also controlled by a 64 KHz clock. In every cycle of the 800 Hz clock 208, a new PWM duty cycle is applied to DC-DC converter 270. As output 275 is being adjusted by the PWM pulse, the PWM duty cycle is monitored and adjusted in every clock cycle of the 64 KHz clock 206, to determine if an overshoot or undershoot condition has occurred. In other words, if Vout 275 is changing too fast and has moved past target value Vtarget 204, pulse width adjustment is reduced for the next cycle. In an alternative embodiment of the invention, the fine tuning cycle can be driven by a different clock than the PWM pulse generator. Coarse tuning process and fine tuning process combine to speed up the convergence of the DC-DC converter to a target setting. Details of tuning methods according to embodiments of the invention will now be further discussed below.

Figure 3:
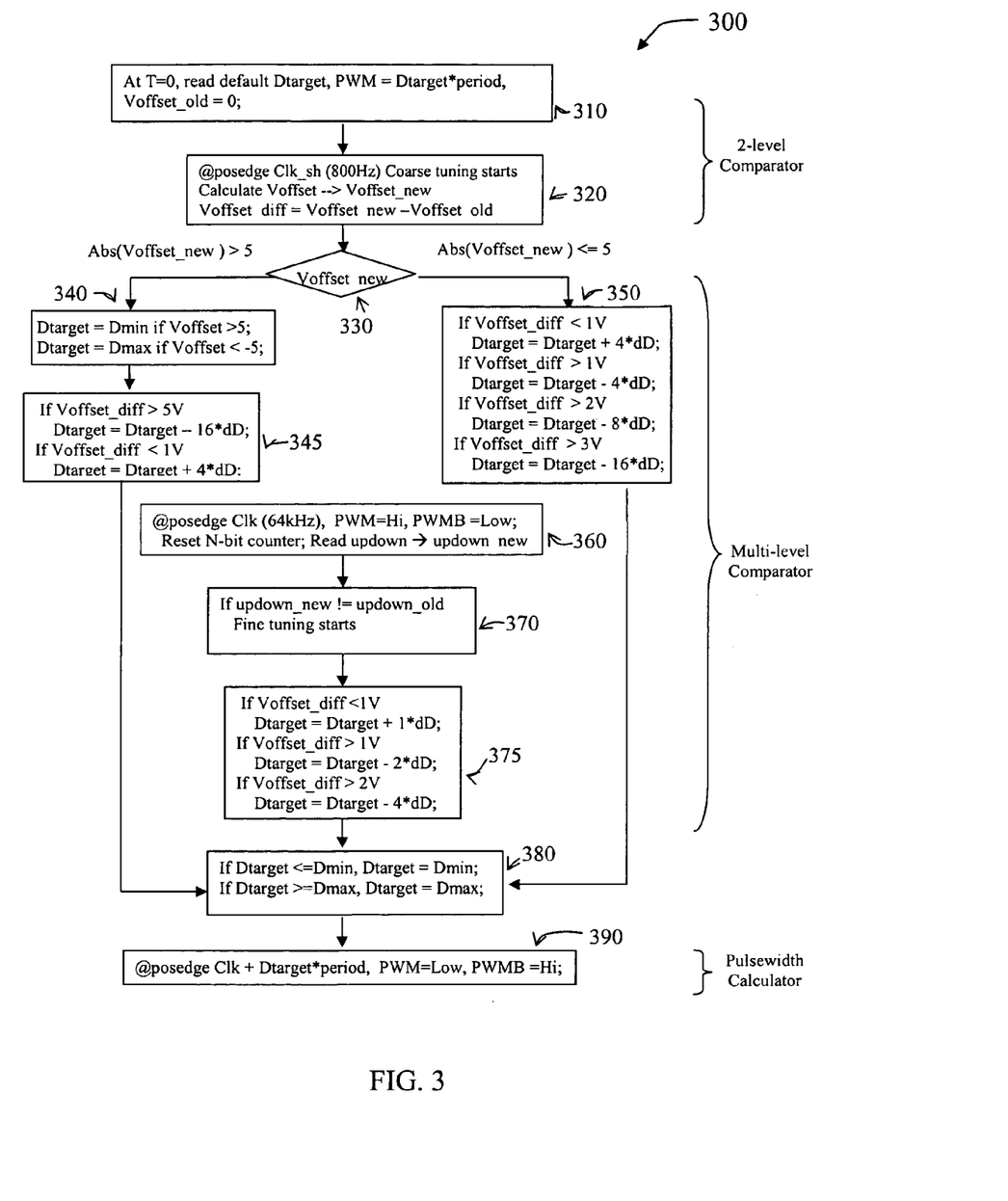
FIG. 3 shows a simplified flow chart illustrating a method for generating a PWM control signal for a DC-DC converter according to an embodiment of the present invention.

FIG. 3 is a simplified flowchart illustrating a method for generating a pulse width modulated control signal according to an embodiment of the present invention. In an embodiment, the method includes generating a pulse width modulated pulse signal and adjusting its duty cycle according to at least two different schedules, for example, a coarse tuning cycle and a fine tuning cycle. The method also includes deriving a target duty cycle according to an offset between output voltage and target voltage, as well as the rate of changes in the offset. In the coarse cycle, large changes in control signal pulse width is made to drive output voltage to target at a fast pace. As output voltage approaches target voltage, smaller adjustment are made to the duty cycle of the control pulse. The rate of pulse width change is also taken into consideration, according to embodiments of this invention, to further optimize operation of the DC-DC converter. The methods and apparatus according to embodiments of the present invention can enable a DC-DC converter output voltage to converge to a target voltage quickly and reduce overshoot or undershoot ripples, which can introduce unwanted delays. These performance improvements can bring additional benefits, such as noise reduction, in the application circuits. These and other benefits are further discussed in the following paragraphs with reference to FIG. 3.

First, the terminology used in FIG. 3 is listed below.

| | |
|---|---|
| Dtarget: | Target duty cycle; |
| dD: | Minimum step size of Dtarget change; |
| PW: | Pulse Width; |
| Period: | Master clock cycle time; |
| Clk: | PWM Clock; |
| Clk_sh: | Sample/Hold output clock; |
| Vtarget: | Target output voltage; |
| Voffset: | Difference between Vtarget and Vout or Vout − Voffset; |
| DCDRV: | Positive control output signal; |
| DCFF: | Negative control output signal. |

As discussed earlier, the methods and apparatus according embodiments of the present invention include generating a pulse width modulated pulse signal and adjusting its duty cycle according to at least two different schedules, for example, a coarse tuning cycle and a fine tuning cycle. The methods and apparatus also include deriving target duty cycles in response to offsets between output voltage and target voltage, as well as the rate of change of offsets. Referring to FIG. 3, the coarse tuning process starts with step 310 and takes one of two branches at decision steps 330. Note that fine tuning cycle starts with step 360.

In an aspect of the invention, initial values of certain parameters are set in the startup step 310. As shown, a predetermined default target duty cycle Dtarget is selected and parameter Voffset_old is set to zero. In a particular embodiment of the invention, default Dtarget can be 0. Alternatively in another embodiment, Dtarget can be set to a predetermined maximum value, such that the resulting PWM can have a duty cycle of 90% or 95%.

As shown in step 320, coarse tuning is triggered by a clock edge of an 800 Hz clock pulse Clk_sh. In an aspect of the invention, on the rising edge of Clk_sh, a new offset signal Voffset_new is derived from the difference between target voltage Vtarget and the present output voltage Vout. Voffset_old is a previous Voffset calculated in a previous clock cycle. At this point, Voffset_diff, the different between two consecutive offsets Voffset is calculated according to the following equation:

Voffset_diff=Voffset_new−Voffset_old.

Voffset_diff represents the incremental rate of change of Voffset and is used in subsequent steps.

Proceeding now to step 330, the magnitude of Voffset_new is compared to a predetermined maximum offset to determine if special boundary conditions are exceeded for duty cycle control signal Dtarget. For example, if Voffset_new>5V, then the left branch leads to step 340, where Dtarget is set to a predetermine Dmin. If Voffset<−5V, then Dtarget is set to a predetermined Dmax, which can be, for example, 95% in a particular embodiment. Then, as shown in step 345, the rate of offset change Voffset_diff is examined. If Voffset_diff is greater than 5V, then the target duty cycle parameter Dtarget is reduced by 16 times minimum adjustment unit, or 16*dD. On the other hand, if Voffset_diff is less than 1 V, for example, Dtarget is increased by four times dD. The above procedure can be summarized in the following expressions:

If Voffset_diff>5V

Dtarget=Dtarget−16*dD;

If Voffset_diff<1V

Dtarget=Dtarget+4*dD;

Even though specific values have been chosen in this example for illustration purposes, alternative appropriate values can be selected for different applications.

Starting from decision block 330, if Voffset_new is not greater than 5V, indicating that Vout is relatively close Vtarget, the path leading to step 350 is taken. Voffset_diff is compared to a set of predetermined threshold values, and depending on the result of the comparison, Dtarget is adjusted by one of a set of predetermined adjustment values. Since Voffset_diff represents the change in Voffset between two consecutive clock pulses, a large Voffset_diff indicates that Vout is changing at a fast pace. In order to prevent overshoot, pulse width control signal Dtarget is reduced. On the other hand, a small Voffset-diff indicates that Vout is already changing at a slow rate. In order to prepare for convergence, the pulse width control signal Dtarget is reduced by a smaller amount. Alternative, if necessary, Dtarget can be increased by a small amount. The adjustment procedure in step 350 of FIG. 3 is illustrated by the following expressions:

If Voffset_diff<1V

Dtarget=Dtarget+4*dD;

If Voffset_diff>1V

Dtarget=Dtarget−4*dD;

If Voffset_diff>2V

Dtarget=Dtarget−8*dD;

If Voffset_diff>3V

Dtarget=Dtarget−16*dD;

Proceeding now to step 380 in FIG. 3, where a magnitude check is performed to confine Dtarget between two predefined boundary values Dmin and Dmax, as illustrated by the following expressions:

If Dtarget<=Dmin, Dtarget=Dmin;

Dtarget>=Dmax, Dtarget=Dmax.

Then in step 390, a PWM pulse is generated based on the Clk clock signal. At a rising edge of Clk (64 KHz in this example), the PWM signal is dropped to low after a duration of Dtarget*period by setting pulse width parameters DCDRV to Low and DCFF to High. Here the duty cycle control signal, Dtarget, is used to generate a PWM signal having the selected duty cycle. The DC-DC converter uses this duty cycle to modify its output signal Vout until a new Dtarget is calculated in the next cycle of coarse adjustment as driven by the 800 Hz clock.

The above discussion illustrates a procedure for coarse adjustment of pulse width control signal Dtarget according to a specific embodiment of the invention. The pulse width control process can be improved by a fine adjustment procedure according to an embodiment of the invention. Between two cycles of coarse adjustment when control signal Dtarget is recalculated, the fine tuning procedure monitors Vout in order to make more frequent and finer adjustments to the control signal Dtarget. As shown in FIG. 3 step 360, at the rising edge of a 64 KHz clock Clk, two pulse width parameter signals are set to their initial values, DCDRV=Hi and DCFF=Low, respectively. The Updown indicator is loaded into updown_new. Now in step 370, updown_new is compared to updown old to determine if Vout has crossed over Vtarget. In other words, the updown indicator is used to determine whether an overshoot or undershoot condition has occurred as Vout moves toward Vtarget. If a crossover has taken place, a fine tuning procedure 375 is carried out to reduce further drifting of Vout.

In the fine tuning procedure as illustrated in step 375, Voffset_diff is compared to a set of predetermined threshold values, and depending on the result of the comparison, Dtarget is adjusted by one of a set of predetermined adjustment values. Since Voffset_diff represents the change in Voffset between two consecutive clock pulses, a large Voffset-diff indicates that Vout is changing at a fast rate. In order to slow down further changes, pulse width control signal Dtarget is reduced. On the other hand, a small Voffset-diff indicates that Vout is changing at a slow rate, and pulse width control signal Dtarget is reduced by a smaller amount or, if necessary, increased by a small amount. The fine adjustment procedure is illustrated in the following expressions:

If Voffset_diff<1V $Dtarget=Dtarget+1*dD;$

If Voffset_diff>1V $Dtarget=Dtarget-2*dD;$

If Voffset_diff>2V $Dtarget=Dtarget-4*dD;$

Following the fine tuning step 375, the new Dtarget is used to generate a PWM pulse in steps 380 and 390 as discussed earlier in the coarse tuning process.

As discussed above, coarse tuning and fine tuning procedures in a specific embodiment are executed periodically by clock pulses of frequencies 800 Hz and 64 KHz, respectively. A pulse width control signal is monitored and adjusted so a PWM of appropriate duty cycle is generated to drive Vout towards target value Vtarget at a fast rate and, at the same time, minimize overshooting or undershooting conditions.

In a specific embodiment of the invention, the target voltage Vtarget for telephony application is set to be −94V, which is generated by a DC-DC controller from a power supply voltage of about 5V to 12V. In other applications, embodiments according to the present invention can be applied to various telephone circuitry or electronics for mobile applications which may require multiple voltages on the same integrated circuit device.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for generating a pulse-width modulated (PWM) pulse signal for controlling a DC-DC converter, comprising:

providing a first clock pulse signal characterized by a first frequency;

providing a second clock pulse signal characterized by a second frequency, the second frequency of the second clock pulse signal being higher than the first frequency of the first clock pulse signal;

providing a pulse width control signal, the pulse width control signal being characterized with a predetermined initial value;

deriving a feedback measurement from the DC-DC converter, the feedback measurement being associated with a difference between an output voltage of the DC-DC converter and a target voltage;

making a coarse adjustment to the pulse width control signal in every cycle of the first clock pulse signal, the coarse adjustment being associated with the feedback measurement;

making a fine adjustment to the pulse width control signal in every cycle of the second clock pulse signal, the fine adjustment being associated with the feedback measurement; and generating a pulse-width modulated (PWM) pulse signal characterized by a PWM clock frequency, the duty cycle of the PWM pulse signal being characterized by the pulse width control signal.

2. The method as recited in claim 1, wherein deriving the feedback measurement further comprises:

deriving an offset signal, the offset signal being associated with a difference between an output voltage of the DC-DC converter and a target voltage; and deriving a rate signal, the rate signal being associated with a difference between two offset signals from two consecutive clock cycles of the second clock pulse signal.

3. The method as recited in claim 2, wherein making the coarse adjustment to the pulse width control signal further comprises:

determining if the offset signal is greater than a predetermined offset limit value; and if the offset signal is greater than the offset limit signal, making the coarse adjustment to the pulse width control signal further comprising:

providing a predetermined maximum pulse width signal;

comparing the rate signal to a plurality of predetermined rate thresholds;

selecting a first adjustment signal from a first plurality of predetermined pulse width adjustment signals, the first adjustment signal being associated with the rate signal; and deriving a pulse width control signal, the pulse width control signal being associated with the maximum pulse width signal and the first adjustment signal; or if the offset signal is equal to or less than the offset limit signal, making the coarse adjustment to the pulse width control signal further comprising:
  providing a pulse width control signal from a previous PWM clock cycle;
  comparing the rate signal to a plurality of predetermined rate thresholds;
  selecting a second adjustment signal from a second plurality of predetermined pulse width adjustment signals, the second adjustment signal being associated with the rate signal; and
  deriving a pulse width control signal, the pulse width control being associated with the pulse width control signal from a previous PWM clock cycle and the second adjustment signal.

4. The method as recited in claim 2, wherein making the fine adjustment to the pulse width control signal further comprises:
  determining whether the magnitude of the output voltage of the DC-DC converter has crossed over the target voltage;
  if the output voltage has crossed over the target voltage, making the fine adjustment to the pulse width control signal furthering comprising:
    providing a pulse width control signal from a previous PWM clock cycle;
    comparing the rate signal to a third plurality of predetermined rate thresholds;
    selecting a third adjustment signal from a third plurality of predetermined pulse width adjustment signals, the third adjustment signal being associated with the rate signal; and
    generating a pulse width control signal, the pulse width control signal being associated with the pulse width control signal from a previous PWM clock cycle and the third adjustment signal.

5. The method as recited in claim 1, wherein generating a pulse-width modulated (PWM) pulse signal further comprises:
  providing a PWM clock pulse signal, the PWM clock pulse being characterized by a PWM clock frequency; and
  adjusting the pulse width of the PWM clock pulse signal, the pulse width of the PWM clock pulse signal being characterized by the pulse width control signal.

6. The method as recited in claim 1, wherein the first frequency is about 800 Hz.

7. The method as recited in claim 1, wherein the second frequency is about 64 kHz.

8. The method as recited in claim 1, wherein the predetermined initial value for the pulse width control signal is zero.

9. The method as recited in claim 1, wherein the predetermined initial value for the pulse width control signal is a predetermined maximum signal.

10. The method as recited in claim 1, wherein the PWM pulse signal is characterized by the second frequency of the second clock pulse signal.

11. A method for controlling a DC-DC converter, the method comprising:
  providing a first clock pulse signal characterized by a first frequency;
  providing a second clock pulse signal characterized by a second frequency, the second frequency of the second clock pulse signal being higher than the first frequency of the first clock pulse;
  deriving a feedback measurement from the DC-DC converter, the feedback measurement being associated with a difference between an output voltage of the DC-DC converter and a target voltage;
  processing the feedback measurement using the first clock pulse to generate a pulse width control signal;
  processing the feedback measurement using the second clock pulse to adjust the pulse width control signal;
  generating a pulse-width modulated (PWM) pulse signal, the pulse width of the PWM pulse being characterized by the pulse width control signal;
  applying the PWM pulse signal to an output switch of the DC-DC converter; and
  generating an output voltage by causing the output switch of the DC-DC converter to turn on or off in response to the PWM pulse signal.

12. An apparatus for controlling a DC-DC converter, comprising:
  a first clock generator configured to generate a first clock pulse signal characterized by a first frequency;
  a second clock generator configured to generate a second clock pulse signal characterized by a second frequency, the second frequency of the second clock pulse signal being higher than the first frequency of the first clock pulse;
  a target signal line;
  an analog-to-digital converter coupled to an output of the DC-DC converter;
  a first comparator circuit coupled to an output of the DC-DC converter and the target signal line, the first comparator being configured to determine whether the output signal of the DC-DC converter has crossed over the target signal;
  a second comparator circuit coupled to an output of the analog-to-digital converter and the target signal line, the second comparator circuit being configured to derive an offset signal and an offset rate signal, the offset signal and the offset rate signal being associated with a difference between an output signal of the analog-to-digital converter and the target signal;
  a third comparator circuit coupled to an output of the first comparator and an output of the second comparator, the third comparator circuit being configured to derive a pulse-width control signal in every clock cycle of the first clock pulse signal and in every clock cycle of the second clock pulse signal, the pulse-width control signal being associated with the offset signal and the offset rate signal; and
  a PWM pulse generator configured to generate a pulse-width modulated (PWM) pulse signal, the pulse width of the PWM pulse signal being characterized by the pulse-width control signal.

13. A DC-DC converter system, comprising:
  a DC-DC converter;
  a first clock generator configured to generate a first clock pulse signal characterized by a first frequency;
  a second clock generator configured to generate a second clock pulse signal characterized by a second frequency, the second frequency of the second clock pulse signal being higher than the first frequency of the first clock pulse signal;
  a feedback control circuit configured to derive a feedback measurement from the DC-DC converter, the feedback measurement being associated with a difference between an output voltage of the DC-DC converter and a target voltage;

a first signal generator configured to process the feedback measurement using the first clock pulse to generate a pulse width control signal;

a second signal generator configured to process the feedback measurement using the second clock pulse to adjust the pulse width control signal;

a PWM pulse generator configured to generate a pulse-width modulated (PWM) pulse signal, the pulse width of the PWM pulse signal being characterized by the pulse width control signal; and a coupling circuit configured to couple the PWM pulse signal to an output switch of the DC-DC converter.

14. The DC-DC converter system as recited in claim 13, wherein the feedback control circuit further comprises:

a first feedback comparator circuit configured to derive an offset signal, the offset signal being associated with a difference between an output voltage of the DC-DC converter and a target voltage; and a second feedback comparator circuit configured to derive an offset rate signal, the offset rate signal being associated with the difference between two offset signals from two consecutive clock cycles of the second clock pulse signal.

15. The DC-DC converter system as recited in claim 14, wherein the first feedback comparator circuit further comprises:

a first comparator configured to compare the offset signal to a predetermined offset limit signal;

a first selection circuit configured to select a first adjustment signal from a first plurality of predetermined pulse width adjustment signals, the first adjustment signal being associated with the offset signal; and a signal generator configured to generate a pulse width control signal, the pulse width control signal being associated with the offset signal and the first adjustment signal.

16. The DC-DC converter system as recited in claim 14, wherein the second feedback comparator circuit further comprises:

a second comparator circuit configured to determine whether the output voltage of the DC-DC converter has crossed over the target voltage;

a storage circuit configured to store a pulse width control signal from a previous PWM clock cycle;

a second selection circuit configured to select a second adjustment signal from a second plurality of predetermined pulse width adjustment signals, the second adjustment signal being associated with the offset rate signal; and a signal generator configured to derive a pulse width control signal, the pulse width control signal being associated with the pulse width control signal from a previous PWM clock cycle and the second adjustment signal.

17. The DC-DC converter system as recited in claim 13, wherein the PWM pulse generator further comprises:

a PWM clock pulse signal generator characterized by a PWM clock frequency;

a pulse width adjusting circuit configured to adjust the pulse width of the PWM clock signal, the pulse width of the PWM clock signal being associated with the pulse width control signal.

18. The DC-DC converter system as recited in claim 13, wherein the first frequency is about 800 Hz.

19. The DC-DC converter system as recited in claim 13, wherein the second frequency is about 64 kHz.

20. The DC-DC converter system as recited in claim 13, wherein the PWM pulse signal is characterized by the second frequency of the second clock pulse signal.

* * * * *